United States Patent
Xiong et al.

(10) Patent No.: US 10,990,107 B2
(45) Date of Patent: Apr. 27, 2021

(54) FOOT WITH OBSTACLE DETECTING ABILITY AND ROBOT HAVING THE SAME

(71) Applicant: UBTECH Robotics Corp, Shenzhen (CN)

(72) Inventors: Youjun Xiong, Shenzhen (CN);
Meichun Liu, Shenzhen (CN);
Xiaopeng Wu, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 374 days.

(21) Appl. No.: 16/159,743

(22) Filed: Oct. 15, 2018

(65) Prior Publication Data
US 2019/0163195 A1 May 30, 2019

(30) Foreign Application Priority Data
Nov. 28, 2017 (CN) .............................. 201711214068

(51) Int. Cl.
*G05D 1/02* (2020.01)
*G01S 7/481* (2006.01)
*B62D 57/032* (2006.01)
*G01S 17/931* (2020.01)

(52) U.S. Cl.
CPC ......... *G05D 1/0242* (2013.01); *B62D 57/032* (2013.01); *G01S 7/4813* (2013.01); *G01S 17/931* (2020.01); *G05D 1/024* (2013.01); *G05D 2201/0217* (2013.01)

(58) Field of Classification Search
CPC ................................ G05D 1/02; B62D 57/032
See application file for complete search history.

(56) References Cited

U.S. PATENT DOCUMENTS

| | | | |
|---|---|---|---|
| 2005/0151497 A1* | 7/2005 | Nagasaka | B62D 57/032 318/568.12 |
| 2007/0061040 A1* | 3/2007 | Augenbraun | A47L 5/225 700/245 |
| 2010/0126785 A1* | 5/2010 | Shimada | B62D 57/032 180/8.1 |
| 2013/0000156 A1* | 1/2013 | Andoh | A43B 3/0005 36/136 |
| 2013/0144439 A1* | 6/2013 | Lee | B25J 9/1633 700/261 |
| 2013/0226344 A1* | 8/2013 | Wong | G05D 1/0242 700/258 |

(Continued)

OTHER PUBLICATIONS

Shannon et al "Shoe stiffening inserts for first metatarsophalangeal joint osteoarthritis (the simple trial): study protocol for a randomised controlled trial"; 13 pages (Year: 2017).*

*Primary Examiner* — Kira Nguyen

(57) ABSTRACT

A foot of a robot includes a lower plate, a first infrared transmitting and receiving unit and a circuit board electrically connected to the first infrared transmitting and receiving unit that are arranged on the lower plate. The first infrared transmitting and receiving unit is arranged in such a way that infrared light transmitted from and received by the first infrared transmitting and receiving unit travels in paths that are inclined with respect to the lower plate toward an area in front of the foot when the lower plate is substantially horizontal, so as to detect existence of a footing.

20 Claims, 2 Drawing Sheets

(56) References Cited

U.S. PATENT DOCUMENTS

| | | | |
|---|---|---|---|
| 2015/0019013 A1* | 1/2015 | Rose | B25J 15/10 700/258 |
| 2016/0253891 A1* | 9/2016 | Hyde | G06K 9/00624 340/540 |
| 2017/0368685 A1* | 12/2017 | Lin | G05D 1/0242 |

* cited by examiner

FOOT WITH OBSTACLE DETECTING ABILITY AND ROBOT HAVING THE SAME

CROSS REFERENCE TO RELATED APPLICATIONS

This application claims priority to Chinese Patent Application No. 201711214068.X, filed Nov. 28, 2017, which is hereby incorporated by reference herein as if set forth in its entirety.

BACKGROUND

1. Technical Field

The present disclosure generally relates to robots, and particularly to a foot of a robot with obstacle detecting ability and a robot including the foot.

2. Description of Related Art

Obstacle detection is a primary requirement for an autonomous robot. With obstacle detecting ability, an autonomous robot can change direction to avoid collision or loss of footing. Most commercial autonomous robots use range sensor to detect obstacles. The use of radar and ultrasonic sensor for developing an obstacle detection system had started as early as the 1980's. An ultrasonic sensor-based obstacle detection system needs many ultrasonic sensors. Since sound waves tend to be interfered by the environment, and thus it is not easy to achieve high accuracy and high sensitivity, and the cost is high.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
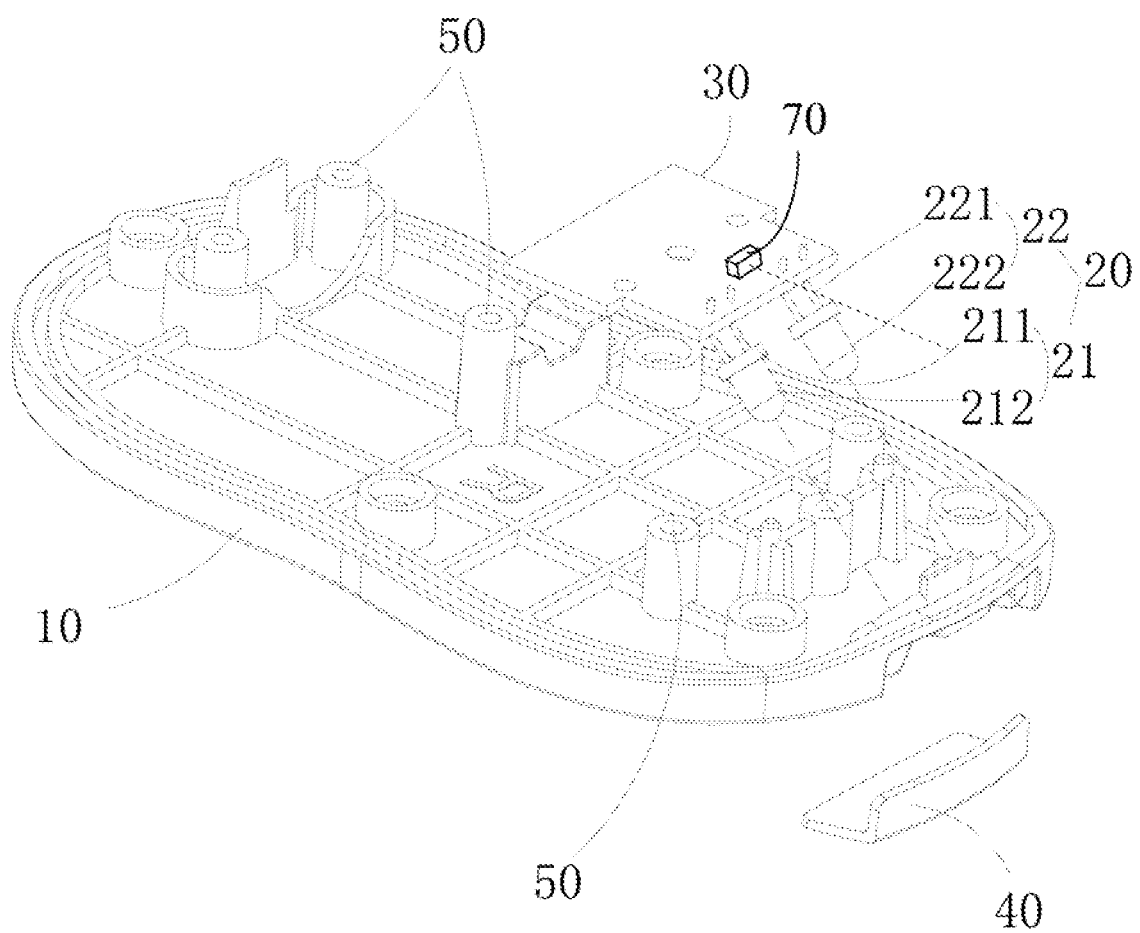
FIG. 1 is an isometric view of a foot of a robot according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The terms "upper", "lower", "left" and "right", indicating the orientational or positional relationship based on the orientational or positional relationship shown in the drawings, are merely for convenience of description, but are not intended to indicate or imply that the device or elements must have a particular orientation or be constructed and operated in a particular orientation, and therefore should not be construed as limiting the present invention. The terms "first" and "second" are used for descriptive purposes only and are not to be construed as indicating or implying relative importance or implicitly indicating the number of technical features. The meaning of "multiple" is two or more, unless expressly stated otherwise.

Figure 2:
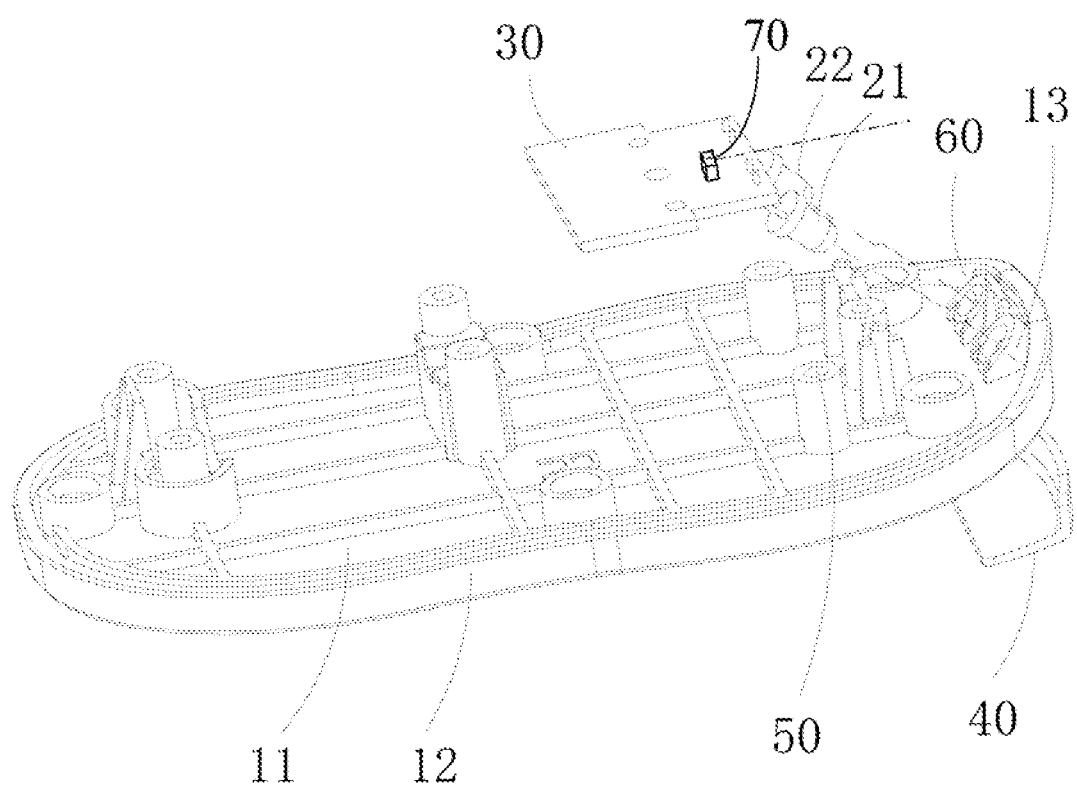
FIG. 2 is an isometric view of the foot of FIG. 1, viewed from a different perspective.

Referring to FIGS. 1-2, in one embodiment, a foot of a robot has an obstacle detecting ability and includes a lower plate 10, a first infrared transmitting and receiving unit 20 and a circuit board 30 electrically connected to the first infrared transmitting and receiving unit 20 that are arranged on the lower plate 10. The first infrared transmitting and receiving unit 20 is arranged in such a way that infrared light transmitted from and received by the infrared transmitting and receiving unit travels in paths that are inclined with respect to the lower plate 10 toward an area in front of the foot when the lower plate 10 is substantially horizontal, so as to detect existence of a footing in an area where the foot is about to land. Specifically, the infrared transmitting and receiving unit 20 is arranged at the front end of the lower plate 10. The light transmitted from the infrared transmitting and receiving unit 20 travels in a path different from the path in which the light received by the infrared transmitting and receiving unit 20 travels, so as to prevent the light received by the infrared transmitting from being interfered.

The working principle of the foot of the present disclosure is as follows: When the robot walks, the lower plate 10 stays horizontal. The transmitting portion of the first infrared transmitting and receiving unit 20 emits infrared light obliquely downward. The infrared light is received by the receiving portion of the first infrared transmitting and receiving unit 20 after being reflected by an object. The signal intensity of the reflected infrared light is related to the distance of the object with respect to the transmitting portion. When the distance is small, the reflected signal is strong, which means that there exists a footing in the area where the foot is about to land. When the distance is large, the reflected signal is weak, which means that there does not exist a footing in the area where the foot is about to land. In this case, the robot is controlled to stop further walking so as to prevent the robot from falling.

The technical effects of the foot of the present disclosure are as follows: Infrared light is used to detect an object, which is less susceptible to environmental noise, weather, ambient light, etc., and has better stability, high detection accuracy and sensitivity, and low manufacturing cost compared with acoustic sensor-based obstacle detection system.

In one embodiment, the foot further includes an infrared light transparent sheet 40. The infrared light transparent sheet 40 is connected to the front end of the lower plate 10 and covers the first infrared transmitting and receiving unit 20 so as to prevent it from being damaged due to exposure to the outside environment. Besides, the infrared light transparent sheet 40 can also result in a complete and beautiful appearance of the lower plate 10 and increase the strength of the lower plate 10.

In one embodiment, the lower plate 10 defines a number of connecting holes 50 for the connection of a leg assembly and the connection of the circuit board 30. The circuit board 30 is fixedly connected to the lower plate 10 via screws that screwed into the connecting holes 50. The electrical connection between the first infrared transmitting and receiving unit 20 and the circuit board 30 is preferably achieved by soldering.

Referring again to FIG. 1, the first infrared transmitting and receiving unit 20 includes a first infrared emitter 21 and a first infrared receiver 22. The first infrared emitter 21 may be an infrared light emitting diode, including first transmitting pins 211 and a first light emitting portion 212. The first infrared receiver 22 includes first receiving pins 221 and a first receiving portion 222. The first transmitting pins 211 and the first receiving pins 221 are connected to the circuit board 30 and are bent at an angle to tilt the first light emitting portion 212 and the first receiving portion 222 downward. In order to facilitate the design of the light-emitting path and light-receiving path, the inclination angles of the first light emitting portion 212 and the first receiving portion 222 are preferably the same. The angle of the inclination may be determined according to the horizontal distance between the area to be detected and any one of the first light emitting portion 212 and the first receiving portion 222 and vertical distance between the lower plate 10 and any one of the first light emitting portion 212 and the first receiving portion 222.

Referring again to FIG. 2, in order to stably mount the first light emitting portion 212 and the first receiving portion 222 on the lower plate 10, first positioning holes 60 for receiving the first light emitting portion 212 and the first receiving portion 222 are provided in the lower plate 10. Specifically, the lower plate 10 includes a main body 11 and a ridge 12 extending along the edge of the main body 11. Two raised portions 13 protrude from the main body 11 at the front end thereof adjacent to the ridge 12. The raised portions 13 are inclined with respect to the main body 11. The two through holes 60 are respectively defined in the two raised portions 13, and each of the two through holes 60 has an axis that is inclined with respect to the main body 11. With such configuration, the first light emitting portion 212 and the first receiving portion 222 are stably fit in the holes 60 to prevent them from shaking or being damaged.

With such configuration, the foot can detect existence of a footing in an area where the foot is about to land. The foot can further be configured to prevent it from bumping into an obstacle. Specifically, the foot further includes a second infrared transmitting and receiving unit 70 that is arranged in such a way that infrared light transmitted from and received by the second infrared transmitting and receiving unit 70 travels in paths that are substantially parallel to the lower plate 10 so as to detect an obstacle in front of the foot.

In one embodiment, the second infrared transmitting and receiving unit 70 is connected to the circuit board 30, so that the first infrared transmitting and receiving unit 20 and the second infrared transmitting and receiving unit 70 are connected to the same circuit board 30, which simplifies the circuit structure of the foot. The second infrared transmitting and receiving unit 70 includes a second infrared emitter and a second infrared receiver. The second infrared emitter may be an infrared light emitting diode, including second transmitting pins and a second light emitting portion. The second infrared receiver includes second receiving pins and a second receiving portion. In order to stably mount the second light emitting portion and the second receiving portion on the lower plate 10, second positioning holes for receiving the second light emitting portion and the second receiving portion are provided in the lower plate 10. Specifically, two second raised portions protrude from the lower plate 10 and each of them defines a second positioning hole having an axis extending in a direction parallel to the lower plate 10. The second light emitting portion and the second receiving portion are respectively fit in the second positioning holes.

In one embodiment, the second infrared transmitting and receiving unit 70 is also covered by the infrared transparent sheet 40 so as to protect the second light emitting portion and the second receiving portion.

By the provision of the infrared second transmitting and receiving assembly, the foot can detect an obstacle in front of it. The robot including the foot can thus detect existence of a footing in an area where the foot is about to land and detect an obstacle having low height with respect to the surface where the robot walks. In contrast, some conventional robots detect obstacles by a detector on the head or the torso. The detection sensitivity of the detector to the lower obstacles close to feet is not high or the lower obstacles cannot be detected.

A robot according to an embodiment includes a foot as described above. As another application, the foot can be slightly modified to be used as part of a shoe. People with poor eyesight who wear the shoes may be notified of the existence of lower obstacles close to the shoes.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A foot of a robot comprising a lower plate, a first infrared transmitting and receiving unit and a circuit board electrically connected to the first infrared transmitting and receiving unit that are arranged on the lower plate, wherein the first infrared transmitting and receiving unit is arranged in such a way that infrared light transmitted from and received by the first infrared transmitting and receiving unit travels in paths that are inclined with respect to the lower plate toward an area in front of the foot when the lower plate is substantially horizontal, so as to detect existence of a footing.

2. The foot according to claim 1, further comprising an infrared light transparent sheet, wherein the infrared light transparent sheet is connected to the lower plate and configured to cover the first infrared transmitting and receiving unit.

3. The foot according to claim 1, wherein the circuit hoard is connected to the lower plate via screws, and the first infrared transmitting and receiving unit is soldered to the circuit board.

4. The foot according to claim 1, wherein the first infrared transmitting and receiving unit comprises a first infrared emitter and a first infrared receiver, the first infrared emitter comprises first transmitting pins and a first light emitting portion, and the first infrared receiver comprises first receiving pins and a first receiving portion, the first transmitting pins and the first receiving pins are fixed to the circuit board and are bent so as to enable the first light emitting portion and the first receiving portion to be inclined with respect to the lower plate.

5. The foot according to claim 4, wherein the lower plate defines two through holes to receive the first light emitting portion and the first receiving portion therein.

6. The foot according to claim 5, wherein two raised portions protrude from the lower plate, the two through holes are respectively defined in the two raised portions, and each of the two through holes has an axis that is inclined with respect to the lower plate.

7. The foot according to claim 1, further comprising a second infrared transmitting and receiving unit, wherein the second infrared transmitting and receiving unit is arranged in such a way that infrared light transmitted from and received by the second infrared transmitting and receiving unit travels in paths that are substantially parallel to the lower plate.

8. The foot according to claim 7, wherein the second infrared transmitting and receiving unit is electrically connected to the circuit board.

9. The foot according to claim 7, wherein the second infrared transmitting and receiving unit comprises a second infrared emitter and a second infrared receiver, the second infrared emitter comprises second transmitting pins and a second light emitting portion, and the second infrared receiver comprises second receiving pins and a second receiving portion, the lower plate further defines two receiving holes to receive the second light emitting portion and the second receiving portion.

10. A robot comprising a foot, the foot comprising a lower plate, a first infrared transmitting and receiving unit and a circuit board electrically connected to the first infrared transmitting and receiving unit that are arranged on the lower plate, wherein the first infrared transmitting and receiving unit is arranged in such a way that infrared light transmitted from and received by the first infrared transmitting and receiving unit travels in paths that are inclined with respect to the lower plate toward an area in front of the foot when the lower plate is substantially horizontal, so as to detect existence of a footing.

11. The robot according to claim 10, further comprising an infrared light transparent sheet, wherein the infrared light transparent sheet is connected to the lower plate and configured to cover the first infrared transmitting and receiving unit.

12. The robot according to claim 10, wherein the circuit board is connected to the lower plate via screws, and the first infrared transmitting and receiving unit is soldered to the circuit board.

13. The robot according to claim 10, wherein the first infrared transmitting and receiving unit comprises a first infrared emitter and a first infrared receiver, the first infrared emitter comprises first transmitting pins and a first light emitting portion, and the first infrared receiver comprises first receiving pins and a first receiving portion, the first transmitting pins and the first receiving pins are fixed to the circuit board and are bent so as to enable the first light emitting, portion and the first receiving portion to be inclined with respect to the lower plate.

14. The robot according to claim 13, wherein the lower plate defines two through holes to receive the first light emitting portion and the first receiving portion therein.

15. The robot according to claim 14, wherein two raised portions protrude from the lower plate, the two through holes are respectively defined in the two raised portions, and each of the two through holes has an axis that is inclined with respect to the lower plate.

16. The robot according to claim 10, further comprising a second infrared transmitting and receiving unit, wherein the second infrared transmitting and receiving unit is arranged in such a way that infrared light transmitted from and received by the second infrared transmitting and receiving unit travels in paths that are substantially parallel to the lower plate.

17. The robot according to claim 16, wherein the second infrared transmitting and receiving unit is electrically connected to the circuit board.

18. The robot according to claim 16, wherein the second infrared transmitting and receiving unit comprises a second infrared emitter and a second infrared receiver, the second infrared emitter comprises second transmitting pins and a second light emitting portion, and the second infrared receiver comprises second receiving pins and a second receiving portion, the lower plate further defines two receiving boles to receive the second light emitting portion and the second receiving portion.

19. A foot of a robot, comprising:
a lower plate;
a first infrared transmitting and receiving unit and a circuit board electrically connected the first infrared transmitting and receiving unit that are arranged on the lower plate;
wherein the first infrared transmitting and receiving unit extends along a direction that is inclined with respect to the lower plate so as to transmit infrared light toward an area in front of the foot to detect existence of a footing.

20. The foot according to claim 19, wherein the first infrared transmitting and receiving unit comprises a first infrared emitter and a first infrared receiver, the first infrared emitter comprises first transmitting pins and a first light emitting portion, and the first infrared receiver comprises first receiving pins and a first receiving portion, the first transmitting pins and the first receiving pins fixed to the circuit board and are bent so as to enable the first light omitting portion and the first receiving portion to be inclined with respect to the lower plate.

\* \* \* \* \*